United States Patent [19]

Genty

[11] 4,148,497
[45] Apr. 10, 1979

[54] SEMI-TRAILER LIFTING AND COUPLING GEAR FOR TRACTOR VEHICLES

[75] Inventor: Robert Genty, Pont Sainte Marie, France

[73] Assignee: Rene Baudin, Pont Sainte Marie, France

[21] Appl. No.: 764,277

[22] Filed: Jan. 31, 1977

Related U.S. Application Data

[63] Continuation-in-part of Ser. No. 694,352, Jun. 9, 1976, abandoned.

[30] Foreign Application Priority Data

Mar. 22, 1976 [FR] France .............................. 76 08174
Nov. 23, 1976 [FR] France .............................. 76 35191

[51] Int. Cl.² ................................................ B60D 1/10
[52] U.S. Cl. ................................................ 280/479 A
[58] Field of Search ................ 280/477, 478 R, 479 R, 280/479 A, 449, 451

[56] References Cited

U.S. PATENT DOCUMENTS 2,210,907  8/1940  Erickson ........................ 280/479 A
2,320,168  5/1943  Benjamin ........................ 280/479 A
2,496,474  2/1950  Hyman ........................... 280/479 A
2,549,734  4/1951  White ............................ 280/479 A
3,863,955  2/1975  Muncke .......................... 280/479 A

FOREIGN PATENT DOCUMENTS 244161  12/1965  Austria ............................... 280/479 A Primary Examiner—Joseph F. Peters, Jr.
Assistant Examiner—R. Schrecengost
Attorney, Agent, or Firm—George H. Mitchell, Jr.

[57] ABSTRACT

This device for lifting the pole of a trailer of the semi-carried type and coupling same to a tractor vehicle comprises a supporting bracket secured beneath and at the rear of the tractor in alignment with the center line thereof, a lever having a hook portion adapted to pick up the shackle of the trailer pole and a crosshead-shaped opposite end, this lever being pivoted to said bracket about a horizontal axis in order to move said hook portion by means of a hydraulic actuator from a low, shackle picking-up position to a high coupling and hauling position in which said lever is locked by a safety system releasable by manual, electric or electromagnetic, or hydraulic means.

20 Claims, 6 Drawing Figures

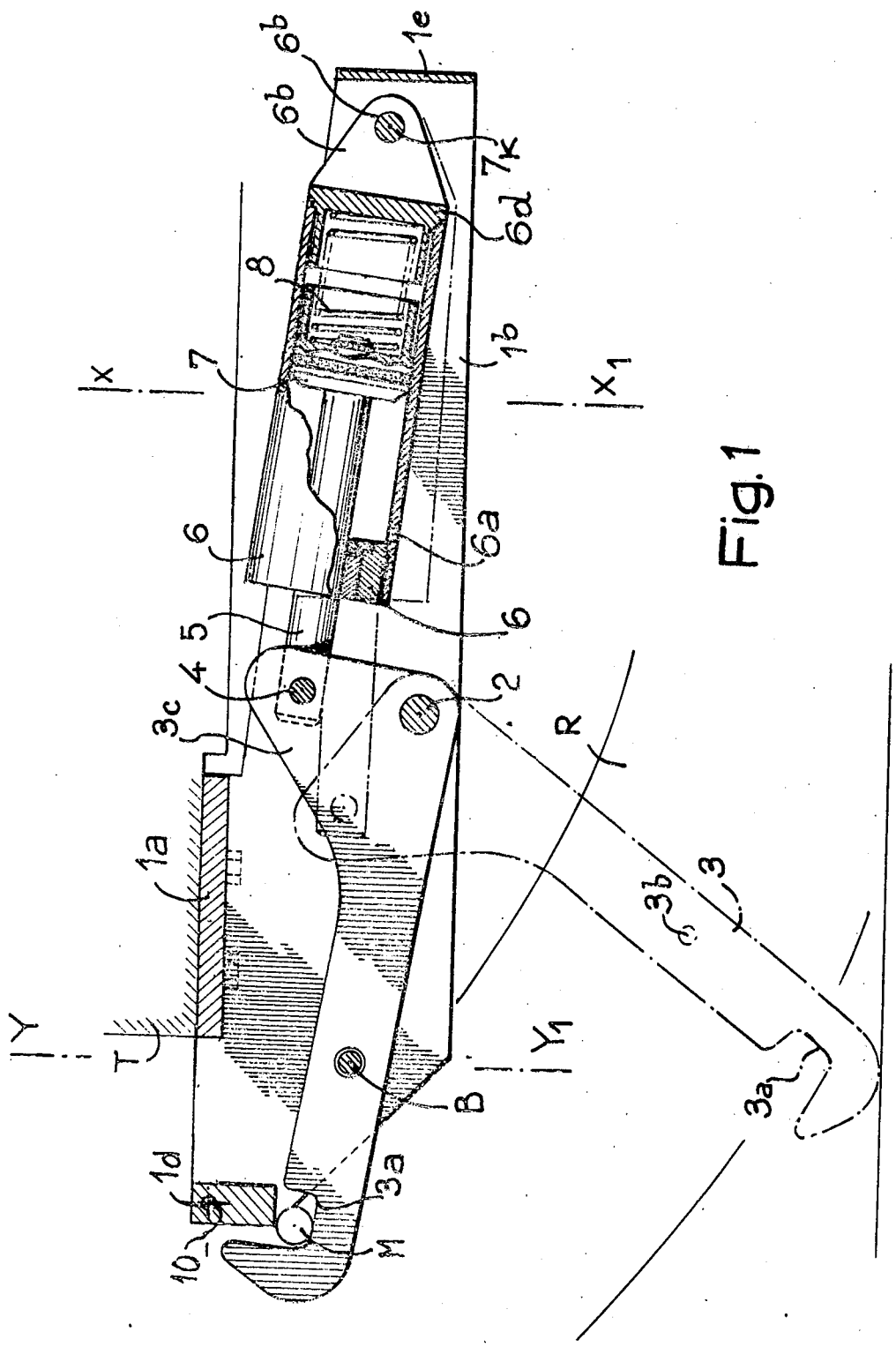

SEMI-TRAILER LIFTING AND COUPLING GEAR FOR TRACTOR VEHICLES

This application is a continuation-in-part of my co-pending application Ser. No. 694,352, filed June 9, 1976 and now abandoned.

BACKGROUND OF THE INVENTION

Field of the Invention

The present invention relates to a device for lifting the pole of a tractor-hauled trailer of the semi-carried type, usually referred to as "semi-trailer," this device being also designed for operating as a coupling gear between the trailer and the tractor.

Although the coupling of a trailer comprising two axles (or two groups of axles) on which the load is distributed is not attended by specific difficulties, since the proper relative positioning of the two vehicles is obtainable in most instances by moving one or the other vehicle to the proper coupling relationship, lifting the pole pivoted to the underframe of the trailer requiring only the lifting of the trailer's weight, it is known that coupling a vehicle of the semi-carried type, i.e., wherein the pole rigidly secured to the underframe of the trailer carries a considerable fraction of the transported load, constitutes an entirely different problem.

In the case of a trailer having two carrier axles, the coupling gear secured to the rear of the trailer comprises a hydraulic cylinder and piston unit adapted to move a lever from a low, ground-level picking position to a high, coupling and hauling position, said lever comprising at its rear end either a strap or a shackle (cf. U.S. Pat. Nos. 2,496,474 and 2,549,734), or a hook (cf. U.S. Pat. Nos. 2,916,300 and 3,863,955).

In the general case of such coupling gears incorporating a strap or a shackle, in most instances the pole is lifted manually. Even in the specific case of a mechanically-operated coupling gear comprising a hook lever, since the lifted load is relatively moderate, manufacturers are inclined to adopt a structure comprising a hook lever or relatively great length in order to take advantage of a relatively small raising angle. Manufacturers are also not expected to solve such problems as the consequence of the effort applied by the tractor to the pole and the coupling gear (this force being negligible), so that the position of the pivot axis of the lever on the support means fastened to the tractor, in relation to the rear axle thereof, can be choosen freely.

This is found notably in the above-mentioned U.S. Pat. Nos. 2,916,300 and 3,863,955, and even in the U.S. Pat. No. 2,549,734, in which the device is completely overhung, externally of the tractor.

In contrast thereto, in the case of a coupling gear for a semi-carried trailer, such as farming trailers without front prop or stand and wherein the pole is not pivoted to the frame, the lifting torque to be overcome by the lifting gear is relatively high (sometimes several tons).

This lifting and coupling gear requires a minimum distance between the trailer axle and the axis for pivoting the lifting lever to its support or bracket rigid with the tractor, in order to minimize the lever arm of the resistant moment.

Consequently, the lever must be extremely short, just as necessary to enable the hook portion thereof on the one hand to be accessible from the rear of the tractor and on the other hand to rest on the ground for picking up the shackle of the trailer.

Besides, the front pivotal mounting of this lever on the tractor, which constitutes the point of application thereto of the load carried by the trailer and transmitted by the pole, and also by the lever itself, should be located as close as possible to the rear axle of the tractor to prevent the latter from being reared by said load, or from impairing the adherence of the tractor front wheels to the ground. It may be noted that these various requirements are rather contradictory to one another, considering the data imposed by the original tractor structure, such as the importance of the ground clearance and of the rear overhanging portion in relation to the rear axle.

DESCRIPTION OF THE INVENTION

Although according to the various tractor types the position of this pivotal mounting of the lever may vary considerably, the Applicant found that this position should theoretically be located not only between the vertical plane containing the axis of the rear axle and the rear end of the tractor, but also substantially in the vicinity of the median plane disposed intermediate these two points.

This arrangement implies that the cylinder and piston unit of the lifting and coupling gear be pivoted on its support at a point considerably downstream of the vertical plane containing the axis of said rear axle.

BRIEF DESCRIPTION OF THE DRAWINGS

FIGS. 1 and 4 are part-sectional elevational views of two different forms of embodiment of the device of this invention;

DESCRIPTION OF THE PREFERRED EMBODIMENTS

Figure 3:
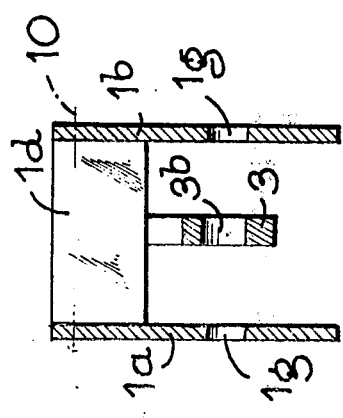
FIG. 3 is a section taken along the mine $Y-Y_1$ of FIG. 1.

As illustrated in the drawings, beneath the rear portion of the tractor and in the median longitudinal plane thereof a single cross-plate 1a (FIG. 1) or a pair of cross-plates 1a and 1p (FIG. 3) is or are secured for example by means of bolts, these cross-plates being an integral part of a bracket 1 comprising a pair of side vertical plates 1b, 1c interconnected by said cross-plates and also, at their ends, by rear and front cross members 1d and 1e, respectively.

Intermediate these ends, the side vertical plates 1b and 1c have formed therethrough a transverse bore in which a horizontal cross pin 2 is trunnioned or journalled.

The axis of this horizontal pin 2 lies in a vertical plane disposed intermediate the plane $(X-X_1)$ containing the axis of the rear axle of the tractor vehicle and the rearmost portion T of this vehicle, or better still approximately in the median plane lying in the middle of this distance or slightly ahead of this plane.

Pivoted to the cross pin 2 is a lever 3 movable in a vertical plane and formed at its rear end with an integral hook portion 3a adapted to engage the shackle M of the pole of the trailer and at its front end with a crosshead 3c. This last end has a bore formed therethrough, engageable by said cross pin 2. The top portion of the crosshead 3c constitutes a strap having aligned holes formed in its webs and adapted to be engaged by a pivot pin 4 of the piston rod 5 of said hydraulic unit 6.

As explained in the foregoing, the lever 3 is as short as possible to prevent any undue elongation of the lever arm formed by the pole, whereby the hook portion 3a thereof lies just beneath the cross-member 1d closing the aperture thereof to prevent the shackle M from becoming loose when the pivot pin 2 is in its foremost position.

The unit 6 is a single-acting telescopic cylinder and piston actuator adapted to be supplied with operating fluid through a port 6a and pivoted about a pin 7k carried by the lateral vertical plates 1b and 1c by means of its end lug 6b formed with a hole 6c and disposed between a pair of bosses or sockets 1m and 1n rigid with the relevant side plates 1b and 1c, in the vicinity of cross member 1e.

Slidably mounted in the body of cylinder 6 closed by a bottom 6d rigid with said lug 6b is a piston 7 rigid with the rod 5.

The piston 7 and bottom 6d are formed with registering cavities enclosing a coil compression spring 8.

The piston recedes due to the delivery of fluid under pressure to port 6a, and moves under the force of spring 8 when the fluid pressure is discontinued, so that the backward movement of piston 7 will pull the crosshead 3c and thus lift the lever 3 from the lower position shown in phantom lines in FIG. 1 to the upper coupling position shown in thick lines.

To prevent the possible overturning of the tractor (or the trailer) from entailing the overturning of the trailer (or tractor), the present coupling gear is so arranged that the shackle M leaves the hook portion 3a when the torsion moment due to such overturning exceeds a predetermined force.

For this purpose, the member 1d engaging the shackle M into the bottom of said hook 3a is secured to the lateral plates by means of one or a plurality of bolts 10 of the controlled breaking type, which yield when the torsion moment exceeds their resistance, thus releasing the shackle.

Figure 4:
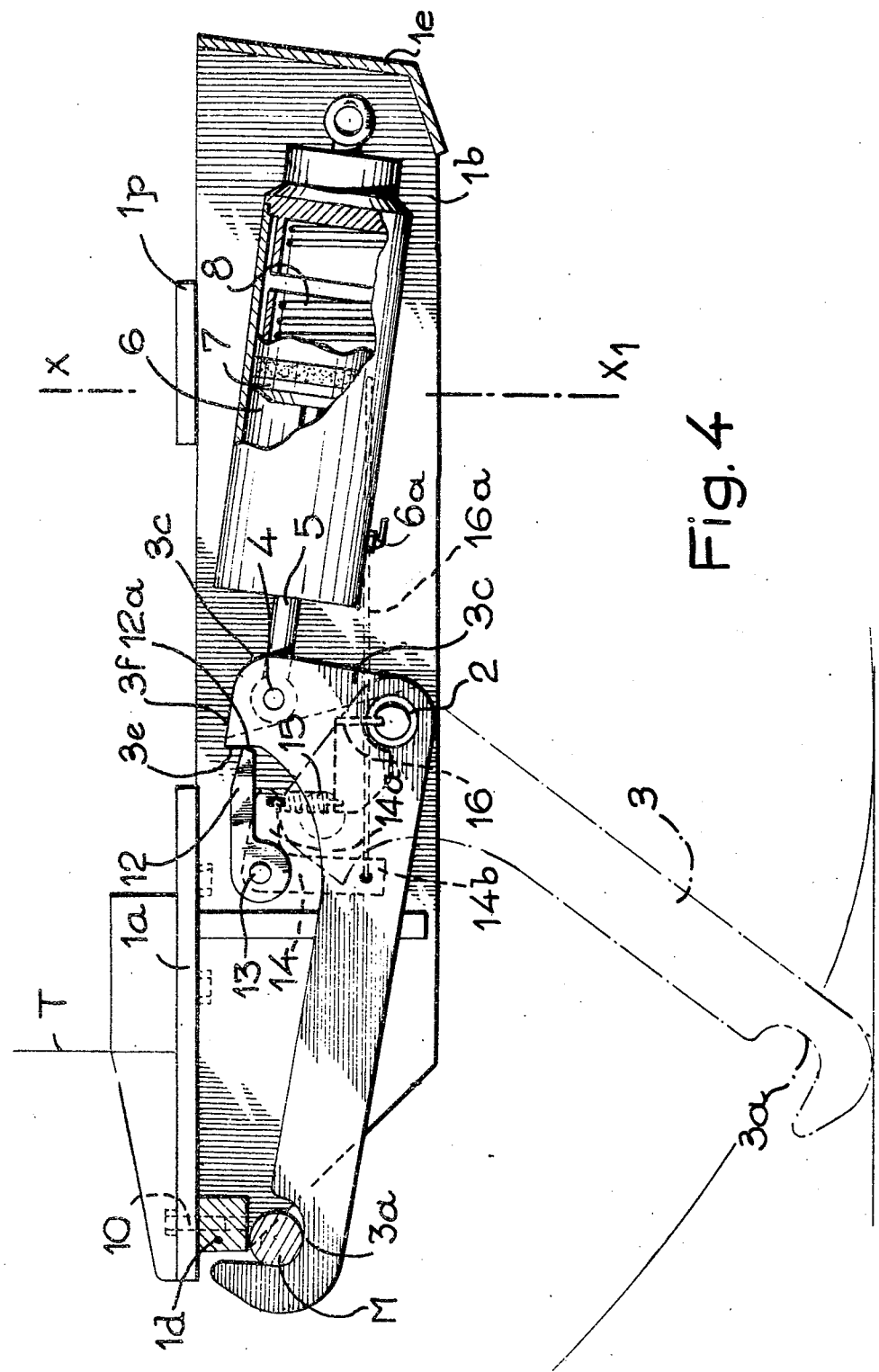

According to the above-described structures, the embodiment illustrated in FIG. 4 is based on the same principle as that of FIG. 1. It differs therefrom only the presence of an additional cross-plate 1p to be secured to the tractor and located in the front portion of the supporting bracket.

To palliate any failure of the cylinder and piston unit 6 during the hauling and the serious consequences that might derive from such failure, it is proper (and prescribed by certain official rules) to have the lever 3 locked by mechanical means.

Figure 2:
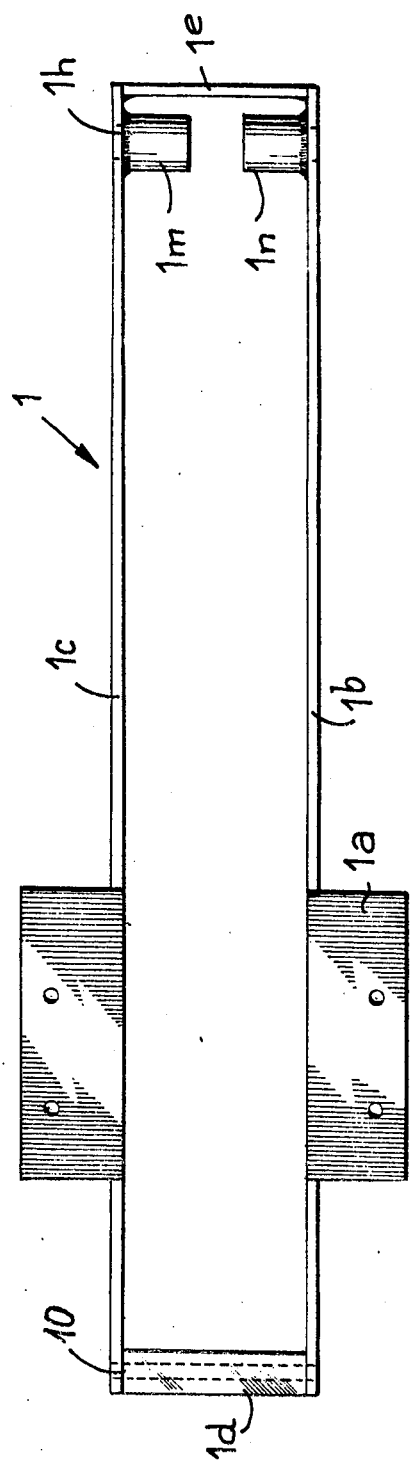
FIG. 2 is a plan view from above showing the supporting bracket of the embodiment of FIG. 1.

In the form of embodiment illustrated in FIGS. 1 to 3 this locking action is obtained by means of a spindle 13 inserted manually into holes 1g formed in said lateral plates 1b and 1c, and also into a central hole 3b formed in said lever 3.

A mechanical solution to this problem has already been proposed (cf. U.S. Pat. No. 3,863,955) wherein a spindle acting as a sliding lock bolt is set in a safety of locking position by a hydraulic cylinder and piston actuator. In addition to complexity of the proposed equipment, the latter is objectionable in that it does not provide a sufficient visual display or information concerning the position of the lock bolt, and therefore some efficient means for checking whether this bolt is in its proper locking position or not.

According to this invention (see FIGS. 4, 5 and 6) the crosshead 3c comprises in the vicinity of pivot pin 4 a shoulder 3e formed on the outer contour thereof and engageable in the uppermost position of lever 3 by a latch bolt 12 pivoted to a pin 13 rigid therewith, and having its ends trunnioned in said lateral vertical plates 1b and 1c.

Externally of said lateral plates is a bell-crank lever 14 rigid with said pivot pin 14.

Fastened to the arm 14b of lever 14 is one end of a traction spring 15 having its opposite end anchored to a fixed element 16 of support 1. The force of this spring 15 constantly urges the latch bolt 12 to its locking position.

In FIG. 4, attached to the other arm 14b of bell-crank 14 is one end of a cable 16 adapted to be pulled against the antagonistic force of spring 15 for lifting the latch bolt 12 when it is desired to release the main lever 3. The contour of this lever 3 in the vicinity of the aforesaid shoulder 3e is curvilinear in order to act as a cam means in relation to said latch bolt, whereby the latter will resume automatically its locking position when the lever 3 is again in its coupling position.

Thus, not only the locking action does not require any particular operation, but on the contrary the release requires a voluntary action, the position of said bell-crank lever 14 providing a visual indication of the position of said latch bolt and therefore on the safety resulting therefrom.

Figure 5:
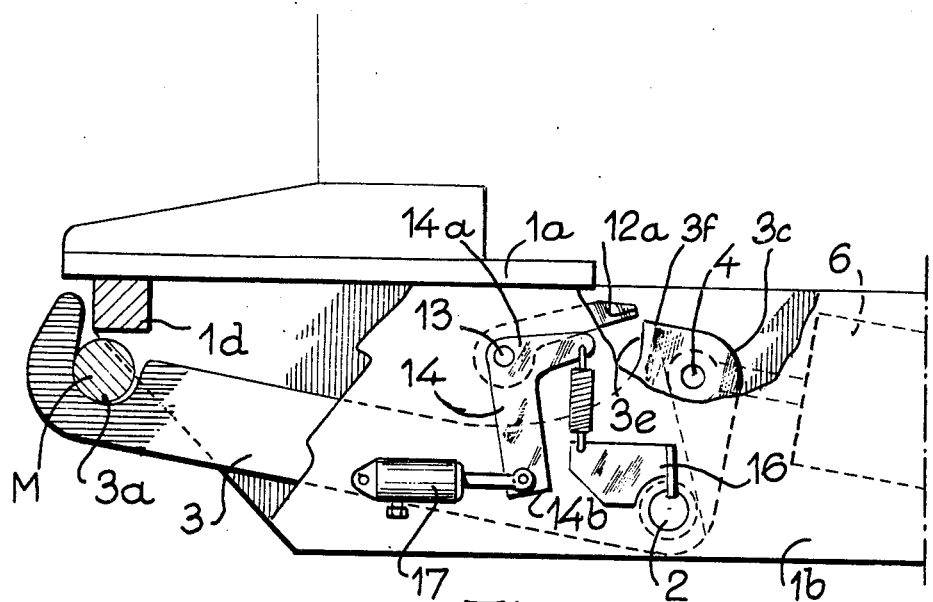
FIGS. 5 and 6 are fragmentary, part-sectional and elevational views of two different forms of embodiment of the safety locking system incorpoated in the device.
Figure 6:
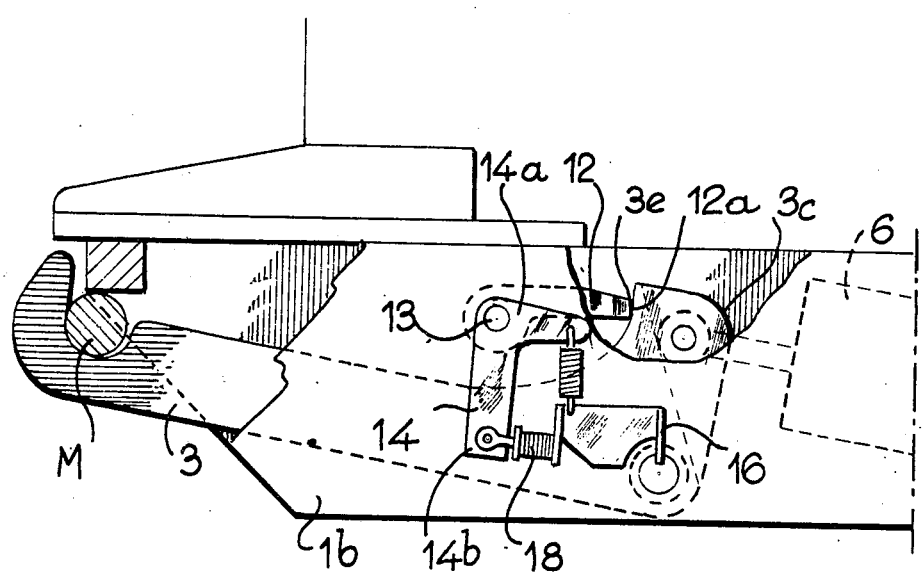

FIGS. 5 and 6 illustrate a possible manner of further improving the automatic operation of the lifting and coupling gear of this invention.

One could utilize directly the piston-rod of hydraulic actuator or the core of an electromagnet for causing the shoulder 3e to abute against the lever 3, but in this case no visual display of the locked condition would be obtained.

It is therefore apparently more advantageous, for preserving this display, to control the locking device described with reference to FIG. 4, that is, by controlling the arm 14b of bell-crank lever 14. As shown in FIG. 5, a complementary hydraulic cylinder and piston unit 17 pivotally mounted to the lateral vertical plate 1d and disposed externally thereof drives the arm 14b of lever 14 when it is desired to uncouple the gear. The same applied to FIG. 6 showing a modified embodiment in which the lever arm 14b is pulled by means of an electromagnet 18.

The angular movement of arm 14b, as caused by one of the three actuators mentioned hereinabove, in antagonism with the force of spring 15, causes the latch bolt 12 to be lifted to the position shown in FIG. 5, and such that the main lever 3 thus released can move downwards about its pivot pin 2. During the movement in the opposite direction corresponding to the lifting of said lever by means of the hydraulic actuator 6, at a predetermined moment the cam-forming lever portion adjacent said pivot pin lifts the latch bolt 12 until the latter falls back into said shoulder 3e. pin 4

Whatever the mode of operation contemplated for this latch bolt 12, that is, by cable 16 (FIG. 4), hydraulic actuator 17 (FIG. 5) or electromagnet 18 (FIG. 6), the latch bolt 12 will automatically resume its position in abutment with crosshead 3c due to the return action exerted by said spring 15.

Although specific forms of embodiment of this invention have been described and illustrated herein, it will readily occur to those conversant with the art that various modifications and changes may be brought thereto without departing from the basic principles of the invention as set forth in the appended claims.

What is claimed as new is:

1. Device for lifting the pole of a trailer of the semi-carried type and coupling same to a tractor vehicle, which comprises a supporting bracket secured beneath, and to the rear of said tractor, substantially in alignment with the longitudinal center line thereof, and further comprising a lever having a hook-shaped rear end adapted to engage the shackle of said trailer pole and a crosshead-shaped opposite end, said lever being pivoted to said supporting bracket about a horizontal axis, a hydraulic cylinder and piston unit mounted on the vehicle and connected to move the hook shaped rear end portion of the lever from a low position corresponding to the picking up of said shackle to a high coupling and hauling position in which said lever is locked against motion by a safety locking system, and a pivot pin for mounting said lever on said supporting bracket about said horizontal axis, said safety locking system including a visible element movable between one position to indicate a locked condition and another position to indicate an unlocked condition, said hydraulic cylinder and piston being adapted to pull said crosshead portion of said lever for lifting same being pivoted to said supporting bracket about an axis located upstream of the plane containing the axis of the rear axle of said tractor, said lever being adapted to be locked in relation to said bracket in the upper coupling position by means of said safety locking system including a latch bolt adapted to abut an inwardly contoured portion of said crosshead shaped opposite end.

2. Coupling device as recited in claim 1, wherein said latch bolt engages in the upper coupling position a shoulder formed in said contoured portion of said crosshead shaped opposite end.

3. Coupling device as recited in claim 2; wherein said shoulder is located in the vicinity of the pivotal mounting of said cylinder and piston unit on said crosshead shaped opposite end.

4. Coupling device as recited in claim 3, wherein the crosshead portion extending between said shoulder and the portion adjacent the pivotal mounting of said cylinder and piston unit is shaped as a cam adapted to lift said latch bolt during the upward and downward movement of said lever.

5. Coupling device as recited in claim 4, wherein said latch bolt is adapted to rotate about a fixed pin and urged to its locking position by a return spring.

6. Coupling device as recited in claim 4, wherein said latch bolt is rotatably solid with a pin rigid in turn with a bell-crank lever having one arm connected to said return spring and the other arm adapted to be actuated manually.

7. Coupling device as recited in claim 5, wherein said latch bolt is adapted to be actuated by electrical or electromagnetic control means.

8. Coupling device as recited in claim 5, wherein said latch bolt is adapted to be actuated by means of an auxiliary hydraulic cylinder and piston unit.

9. Device as recited in claim 1, wherein in the high position of said lever said shackle is retained in said hook-shaped end thereof by means of a member secured to said supporting bracket, wherein safety means are provided to enable said components to move away from each other to release said shackle when said hook-shaped portion is subjected to a predetermined normal torsion stress, for example in case of overturning of the tractor of its trailer.

10. Device as recited in claim 9, wherein said safety means comprises two members connected by a bolt having a controlled breakage characteristic, whereby said coupling becomes disengaged.

11. In and for a vehicle a draw hook comprising a hooked lever terminating with the hook proper, means pivotally connecting the lever to a fixed part of the vehicle about a horizontal axis whereby the lever is displaceable in a vertical plane, a jack supplementary to the existing hydraulic system of the vehicle, and means connecting the jack to the lever whereby said lever is brought into the towing position, and means mounting said jack below said vehicle substantially on the longitudinal axis thereof, said fixed part of the vehicle comprising a chair formed by two flanges joined together by a rear cross-member, a front tie and the base by which the chair is fixed to the chassis of the vehicle, said base being situated to the rear of the horizontal axis, said flanges and said lever being each formed with a hole situated in the rear end of the flanges, the holes of the three elements being adapted to be traversed by a pin when they are aligned in the towing position.

12. A hook as claimed in claim 11, wherein said lever is provided at its end traversed by said horizontal axis with a crosshead to which the free end of the shaft of said jack is pivotally connected.

13. A hook as claimed in claim 12, wherein the lever is brought into the drawing position by traction on said crosshead of said shaft.

14. A hook as claimed in claim 11, wherein the jack is pivotally connected to the two flanges towards the front end thereof.

15. A hook as claimed in claim 11, wherein a safety device is arranged between said hook and the vehicle for allowing a relative rotation between them so that overturning of the tractor vehicle does not result in overturning of the trailer.

16. A hook as claimed in claim 15, wherein the safety device comprises relative rotation means arranged between the shaft of the jack and the cylinder thereof.

17. A hook as claimed in claim 16, wherein the head of the piston is adapted to turn along the longitudinal axis of the jack relative to the shaft which it drives.

18. A hook as claimed in claim 15, wherein the coupling of the trailer is held in the hooked part closed by a member fixed to the fixed part by controlled breakage elements, for example bolts.

19. Coupling device is recited in claim 6, wherein said latch bolt is adapted to be actuated by electric or electromagnetic means.

20. Coupling device as recited in claim 6, wherein said latch bolt is adapted to be actuated by means of an auxiliary hydraulic cylinder and piston unit.

* * * * *

UNITED STATES PATENT OFFICE
CERTIFICATE OF CORRECTION

Patent No. 4,148,497          Dated April 10, 1979

Inventor(s) Robert GENTY

It is certified that error appears in the above-identified patent and that said Letters Patent are hereby corrected as shown below:

Please change the name of the Assignee [73] to

Rene Budin.

*Signed and Sealed this*

*Twenty-third* Day of *October 1979*

[SEAL]

Attest:

RUTH C. MASON
*Attesting Officer*

LUTRELLE F. PARKER
*Acting Commissioner of Patents and Trademarks*